(12) United States Patent
Roth-Stielow et al.

(10) Patent No.: US 6,373,210 B2
(45) Date of Patent: *Apr. 16, 2002

(54) ELECTRIC MOTOR AND METHOD FOR OPERATING SUCH A MOTOR

(75) Inventors: Jörg Roth-Stielow, Bretten; Josef Schmidt, Graben-Neudorf, both of (DE)

(73) Assignee: Sew-Eurodrive GmbH & Co., Bruchsal (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/477,753

(22) Filed: Jan. 4, 2000

Related U.S. Application Data

(63) Continuation of application No. PCT/EP98/04088, filed on Jul. 2, 1998.

(30) Foreign Application Priority Data

Jul. 4, 1997 (DE) .......................... 197 28 711
Aug. 8, 1997 (DE) .......................... 197 34 405

(51) Int. Cl.$^7$ ................................. H02P 3/22
(52) U.S. Cl. ...................... 318/380; 318/362; 318/370; 318/376
(58) Field of Search ................... 318/362–382

(56) References Cited

U.S. PATENT DOCUMENTS

| | | | | |
|---|---|---|---|---|
| 4,039,914 A | * | 8/1977 | Steigerwald et al. | 318/375 |
| 4,145,645 A | | 3/1979 | Price et al. | 318/762 |
| 4,352,049 A | * | 9/1982 | Franz Jr. | 318/370 |
| 5,070,290 A | * | 12/1991 | Iwasa et al. | 318/758 |
| 5,170,105 A | * | 12/1992 | Kumar | 318/362 |
| 5,276,292 A | * | 1/1994 | Goto et al. | 187/288 |
| 5,436,540 A | * | 7/1995 | Kumar | 318/375 |
| 5,710,699 A | * | 1/1998 | King et al. | 363/132 |
| 5,892,342 A | * | 4/1999 | Friedlander et al. | 318/434 |

FOREIGN PATENT DOCUMENTS

| | | |
|---|---|---|
| DE | 44 40 312 A | 7/1995 |
| EP | 0 242 671 A | 10/1987 |

OTHER PUBLICATIONS

Patent Abstract of Japan vol. 008, No. 226 (E–272), Oct. 17, 1984 & JP 59–106897 A (Yasukawa Denki Seisakusho KK), Jun. 20, 1984 siehe Zusammenfassung.

* cited by examiner

Primary Examiner—David S. Martin
(74) Attorney, Agent, or Firm—Marshall, Gerstein, & Borun

(57) ABSTRACT

Conventionally converter-controlled electric motors are allowed to operate in generational mode during braking and to convert the electrical energy so produced into heat. Such motors may also comprise electromagnetically actuated mechanical brakes. In the present invention it is proposed to supply the electrical energy produced by the motor when in a generational mode to an excitation coil of the brake and there store it temporarily as magnetic energy or convert it into heat.

15 Claims, 4 Drawing Sheets

ELECTRIC MOTOR AND METHOD FOR OPERATING SUCH A MOTOR

This is a continuation claiming priority under 35 U.S.C. §120 from International Patent Application Ser. No. PCT/EP98/04088 filed Jul. 2, 1998.

FIELD OF THE INVENTION

The present invention relates to an electric motor, comprising an electromagnetically actuated mechanical brake and to a method of operating an electric motor with an electromagnetically actuated mechanical brake.

DESCRIPTION OF THE PRIOR ART

Electric machines can be controlled by their rotational speed. Electronic means are now available with which such machines can be powered via converters by means of either alternating or direct current supplies. A known method of improving the controllability of such machines during braking, as is required in many applications of such machines, is to operate the machine as a generator and to convert the energy so produced during braking into heat by way of a load resistance. However, the provision of such an additional load resistance involves an increase in expense and complexity of construction of the machine, and furthermore the heat produced must be dissipated by means of additional extra apparatus.

It is further known that such machines, when operated predominantly as electric motors, can be provided with mechanical brakes that can be released or raised by an electromagnet arrangement. Thus, when current is supplied to the electric motor, it is also supplied to the excitation coil of an electromagnetically actuated mechanical brake, and when no current is supplied to the motor, the brake operates to immobilize the motor.

The object of the present invention is to provide an electric motor and a method of operating an electric motor wherein the braking process is substantially simplified with respect to the prior art.

SUMMARY OF THE INVENTION

According to a first aspect of the present invention there is provided a method of operating a converter-controlled electric motor with an electromagnetically actuated brake comprising an excitation coil wherein the method comprises the step of supplying electrical energy to the excitation coil of the brake during braking in a generational mode of the motor for at least one of storage temporarily as magnetic energy and conversion to thermal energy.

According to a second aspect of the present invention there is provided an electric motor comprising an electromagnetically actuated mechanical brake; an excitation coil forming part of the brake; a converter; and a brake control means connected to the electric motor and the excitation coil in such a way that during braking of the electric motor in a generational mode of operation electrical energy produced by the motor is supplied to the excitation coil for at least one of temporary storage and conversion into heat.

By virtue of the invention, the electrical energy produced while the equipment is operating in a generational mode during braking is converted into heat in an excitation coil of the electromagnetically releasable mechanical brake. Conventionally, during mechanical braking the excitation coil is not supplied with any energy. However, the invention makes it possible to operate without a braking resistance and furthermore to exploit the inductivity function of the coil—that is, its particular dynamic action, which the coil exhibits in contrast to an additional ohmic resistance such as is customarily employed.

Preferably, when the brake is applied strongly during operation in a generational mode, a current is supplied to the excitation coil that is considerably larger than that used to release the brake or keep it raised in an off position. That is, advantage is taken of electrical properties of the coil that in normal operation, for the usual release of the brake, are not exploited. However, the excitation coil can be supplied for a certain period with a much larger current than is supplied during normal operation to release the brake or to keep it in an off position.

Preferably, the thermal load on the excitation coil is ascertained and the current supplied to the coil is kept below a predetermined value beyond which the thermal load would exceed a predetermined temperature. It can thereby be ensured that no damage is caused by overheating. Preferably when there is a risk of thermal overloading, the current is limited to the maintenance level for the excitation coil, i.e. the amount of current that flows through the electric motor during maintained operation of the electric motor and is tailored to the excitation coil.

In a preferred embodiment of the invention the thermal load is ascertained by measuring the temperature of the excitation coil. With this kind of load measurement particularly accurate results can be expected. In an alternative embodiment of the invention, which can also be employed as an adjunct to the first embodiment, the current and/or voltage supplied to the excitation coil are/is monitored and these values, in combination with parameters specific to the excitation coil, in particular the thermal time constant of the excitation coil, are processed in such a way that not only is the momentary thermal load known but also, at any time, it can be estimated how long the excitation coil can continue to be operated with the present braking performance before the excitation current must be reduced. By this means the braking behavior can be optimized.

Preferably in addition to the thermal load on the excitation coil, the ambient temperature is also measured. As a result, the excitation coil is still more reliably protected from overloading. The same applies to a measurement of the temperature at the electric motor by means of a corresponding temperature sensor, which is usually present in any case. Once the brake has been mounted on the electric motor, along with its excitation coil, and heat flow is occurring, the temperature of the electric motor also provides a measure of the amount of heat that can still be conducted to the excitation coil.

The various aspects of the present invention will now be described by way of example with reference to the accompanying drawings.

DESCRIPTION OF THE PREFERRED EMBODIMENTS

Figure 1:
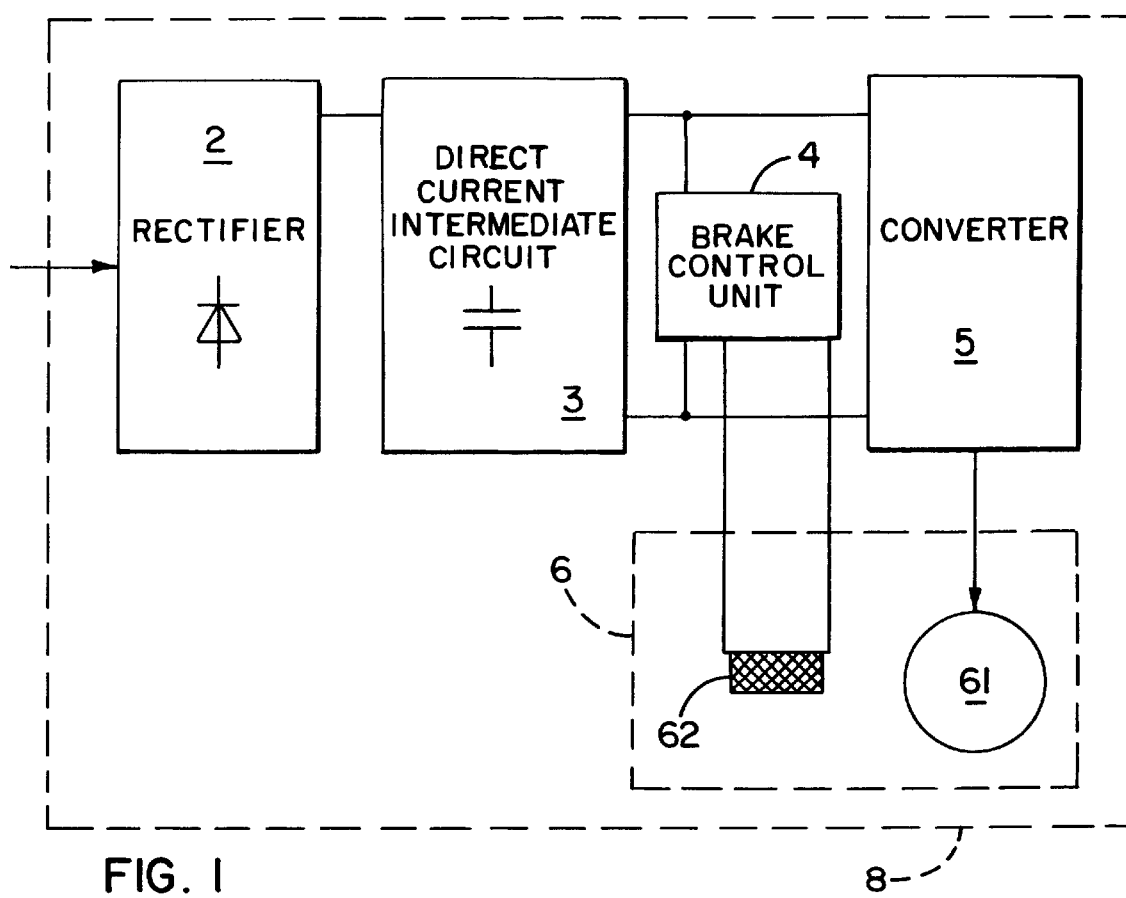
FIG. 1 is a block diagram showing a method of operating an electrical motor according to the present invention.

In the following description, the same reference numerals are used for identical components or parts with identical functions.

In the block diagram of FIG. 1, the reference numeral 1 identifies an alternating-current mains supply, which is applied to a rectifier 2. A rectified output voltage of the latter is applied to a direct-current intermediate circuit 3. To the output terminals of the DC intermediate circuit 3 are attached input connectors of a brake control unit 4, in parallel with input connectors of a converter 5.

Output terminals of the brake control unit 4 are connected to an excitation coil 62 of an electromagnetically actuated mechanical brake, which when supplied with current allows a motor 61 to run freely, and when the current is cut off brakes said motor.

The motor 61 is driven in a manner known per se by the converter 5.

The electric motor 61 is preferably combined with the rectifier 2, the brake control unit 4, the excitation coil 62 and the converter 5 to form a unitary device 8, preferably in a common housing.

Figure 2:
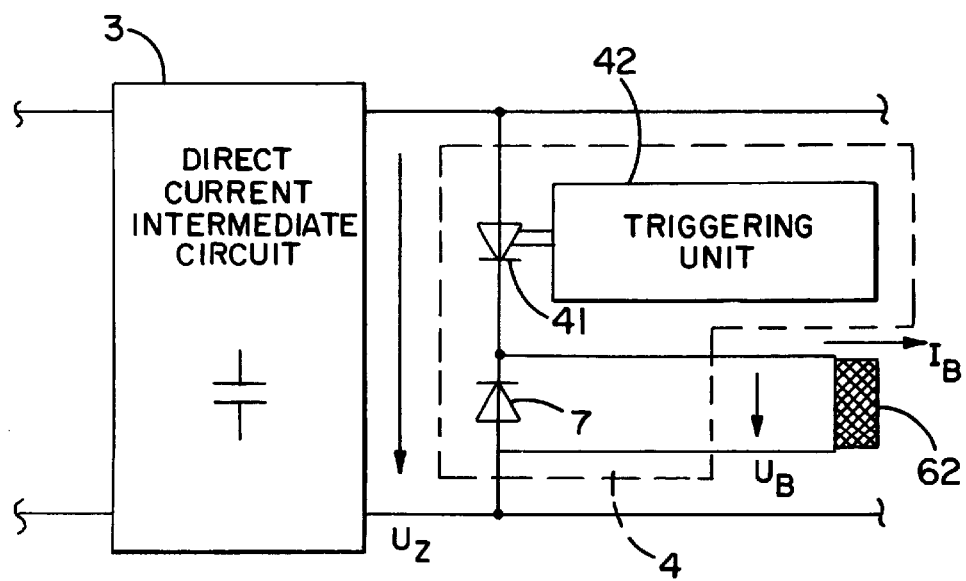
FIG. 2 is a circuit block diagram of a control unit shown in FIG. 1.

The brake control unit 4 comprises, as shown in FIG. 2, in a first embodiment of the invention an electronic one-way valve 41, which can be turned on and off by way of a triggering unit 42. This one-way valve 41 is connected in series with the excitation coil 62 across the output terminals of the DC intermediate circuit 3. The terminals of the excitation coil 62 are connected by way of a recovery diode 7 disposed such that its polarity is reversed with respect to the one-way valve.

In FIG. 2 the current flowing through the excitation coil 62 is designated $I_B$ and the voltage across the terminals of the excitation coil 62 is designated $U_B$. The mode of operation of the arrangement is as follows.

The direct current required to raise the electromagnetically actuated mechanical brake has the value $I_1$. When this current is flowing, a voltage $U_1$ exists across the excitation coil 62.

When the current $I_1$ is turned on, a period of time $t_1$ elapses before the brake has been completely raised. Once it is in the raised position, the direct current needed to keep it in that position is $I_2$, which in general is smaller than or equal to $I_1$. In this state, the voltage drop across the excitation coil 62 has the value $U_2$.

From the circuit shown in FIG. 2 it can be seen that the electronic one-way valve 41 can be switched on and off by the triggering unit 42 in such a way that the entire output voltage $U_Z$ of the DC intermediate circuit 3 can be applied to the excitation coil 62. The modes of operation thus made possible are as follows.

Operating Condition A: the motor 61 is not supplied with any current from the converter 5. The excitation coil 62 is also without current. In this operating condition the motor is firmly braked.

Operating Condition B: at the beginning of motor operation, i.e. when the converter 5 begins to supply current to the motor 61, the brake control unit 4 supplies a direct current $I_B=I_1$ to the excitation coil 62 for a time period $t_1$, in order to raise the brake.

Operating Condition C: while the motor 61 is running in an unbraked state, the brake control unit 4 sends through the excitation coil 62 a direct current $I_B=I_2$ that is required to maintain the electromagnetically actuated mechanical brake in the raised position; this maintenance current $I_2$ can be smaller than the current $I_1$. When the maintenance current $I_2$ s equal to the current $I_1$ needed to raise the brake, the previously described operating condition B is eliminated.

Operating Condition D: when the running motor 61 is to be braked, i.e. switched to operate in a generational mode, the brake control unit 4 sends the direct current $I_B=I_2$, which is needed to keep the electromagnetically actuated mechanical brake in the raised position, through the excitation coil 62 as long as the power fed back from the converter 5 into the DC intermediate circuit 3 is not larger than the power needed to keep the electromagnetically actuated mechanical brake raised.

Operating Condition E: if the power fed back from the converter 5 into the DC intermediate circuit 3 exceeds the power needed to keep the electromagnetically actuated mechanical brake raised, because the braking or generator performance has increased, the brake control unit 4 conducts the entire power returned by the electric motor 61 into the excitation coil 62. This current is considerably larger than the above-mentioned values $I_1$ and $I_2$.

Operating condition F: if the thermal load associated with the supplied current exceeds a maximum permissible value for the excitation coil 62, the brake control unit 4 reduces the current $I_B$ supplied to the excitation coil 62 to the level required to keep the electromagnetically actuated mechanical brake raised, namely the direct current $I_B=I_2$.

In the following a preferred embodiment, a circuit for a brake control unit 4 is described with reference to FIGS. 3 and 4.

Figure 3:
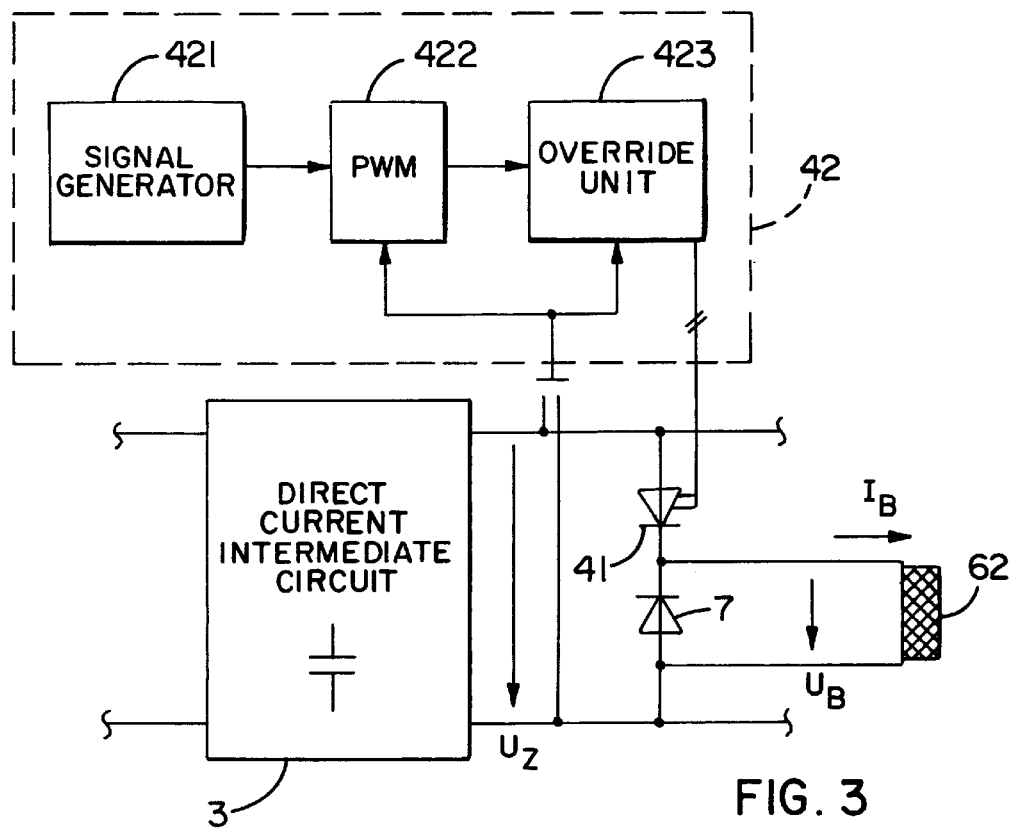
FIG. 3 is a circuit block diagram of a triggering unit.

As shown in FIG. 3, the trigger unit 42 comprises a signal generator 421, the output of which is connected to an input of a pulse-width modulator (PWM) 422. The output of the PWM 422 is supplied to the input of an override unit 423, the output of which is supplied to a control input of the electronic one-way valve 41, which can thereby be turned on and off. The entire arrangement is powered by way of the output terminals of the DC intermediate circuit 3.

Triggering by way of the override unit 423 is achieved as follows. In all operating conditions except Condition E described above, the override unit 423 supplies the output signal of the PWM 422 to the electronic on/off one-way valve 41. The ratio of the durations of "on" and "off", i.e. the duty factor $\lambda$ of the PWM 422, in this case directly determines the mean direct current $U_B$ supplied to the excitation coil 62. It follows that $U_B=\lambda \cdot U_Z$, where $U_Z$ is the output-terminal voltage of the DC intermediate circuit 3. The signal generator 421 generates the standard value for the voltage $U_B$.

In Operating Condition E, when the power sent back from the converter 5 during braking into the DC intermediate circuit 3 exceeds the power needed to keep the electromagnetically actuated mechanical brake raised, the intermediate-circuit voltage $U_Z$ begins to rise above the level of the rectified mains voltage. During this process, if $U_Z$ exceeds a limiting value $U_3$, the on/off one-way valve 41 is switched into a conducting state by the override unit 423, regardless of the standard voltage provided to the pulse-width modulator 422.

The limiting value $U_3$ is set such that on one hand it is appreciably above the rectified mains voltage and on the other hand appreciably below the highest voltage load that can be sustained by the rectifier 2, the DC intermediate circuit 3, the brake control unit 4, the rectifier 5, the motor 61 and the excitation coil 62.

While the system is in the Operating Condition E, if a signal $\vartheta_B$ generated by a temperature sensor to represent the thermal stress on the excitation coil 62, such as is explained in greater detail below, exceeds the highest value that can be sustained by said coil, namely $\vartheta_B$max, a transition to the operating condition F occurs. In this case the override unit 423 again sends the output signal of the PWM 422 to the electronic on/off one-way valve 41 such that current supplied to the excitation coil 62 becomes $I_B=I_2$; that is, the current is reduced to the level that the excitation coil 62 can withstand during long-term operation of the electric motor 61.

Figure 4:
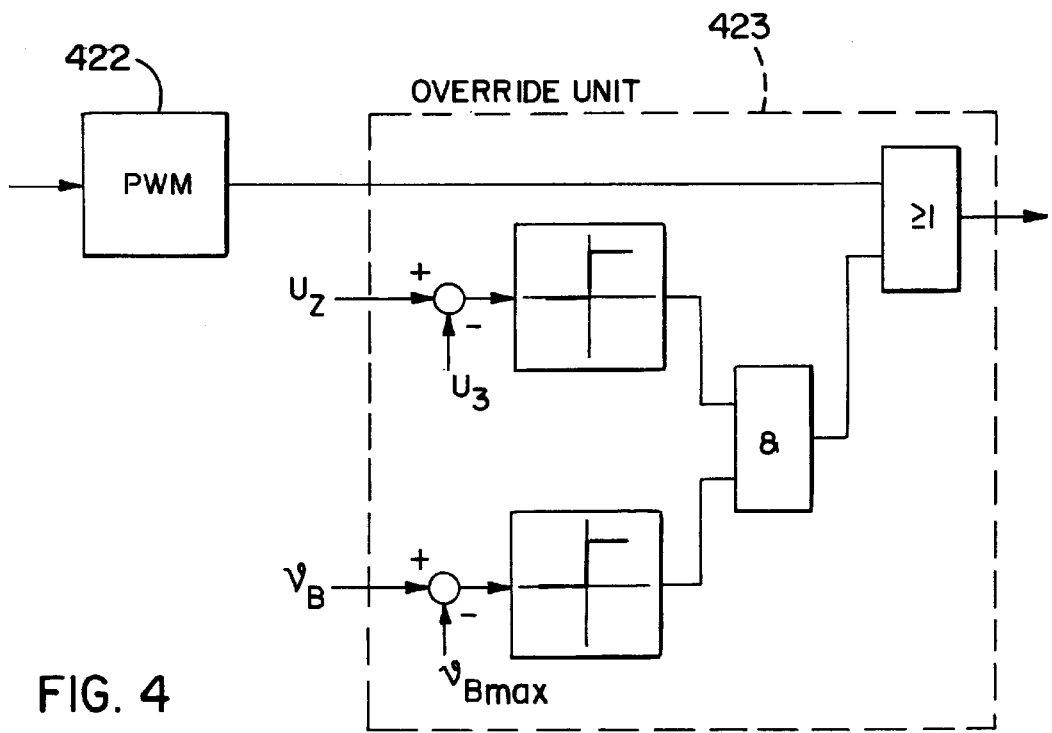
FIG. 4 shows in more detail part of the circuit block diagram shown in FIG. 3.

The above situation is represented in FIG. 4 in the form of a control circuit. Here the override unit 423 comprises a first comparator, which sends out a positive digital output signal when the voltage $U_Z$ at the output terminals of the DC intermediate circuit 3 exceeds a predetermined voltage $U_3$. This limiting value $U_3$ has already been defined above.

A second comparator is provided that compares an actual temperature value $\vartheta_B$ with a maximum permissible temperature value $\vartheta_B$max and sends out a positive digital output signal when the actual value exceeds the maximum value.

The value of the output signal of the first comparator is sent to a non-inverting input of an AND gate, whereas the value of the output signal of the second comparator is sent to an inverting input of the same AND gate. The output of the AND gate is sent to an input of an OR gate, the other input of which is connected to the output of the PWM 422. The output of the OR gate is sent to the control input of the electronic on/off one-way valve 41. As those skilled in the art will see, this circuitry carries out the procedure described above with reference to FIG. 3.

Figure 5:
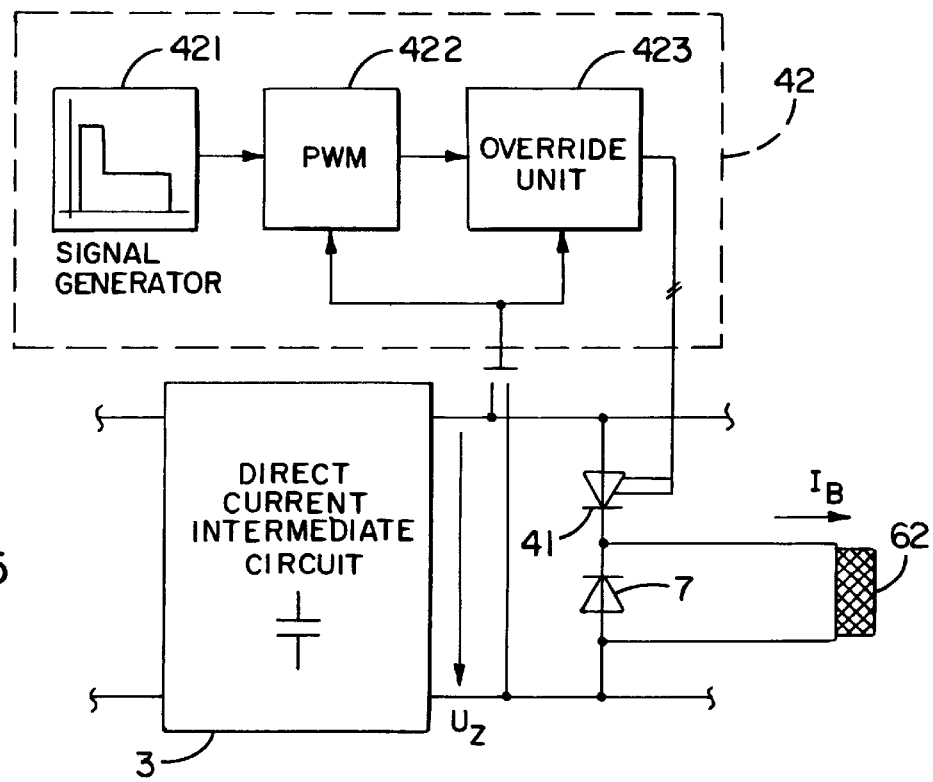
FIG. 5 is a circuit block diagram of a second embodiment of triggering unit.

In the embodiment shown in FIG. 5, the voltage associated with the current $I_B$ through the excitation coil 62 is again supplied from the signal generator 421 to the PWM 422. This voltage $U_B$, associated with the current $I_B$, has the value zero when the system is in Operating Condition A, the value $U_1$, associated with current $I_1$, when in Operating Condition B, and the value $U_2$, associated with current $I_2$, while in Operating Conditions C, D, E and F.

Figure 6:
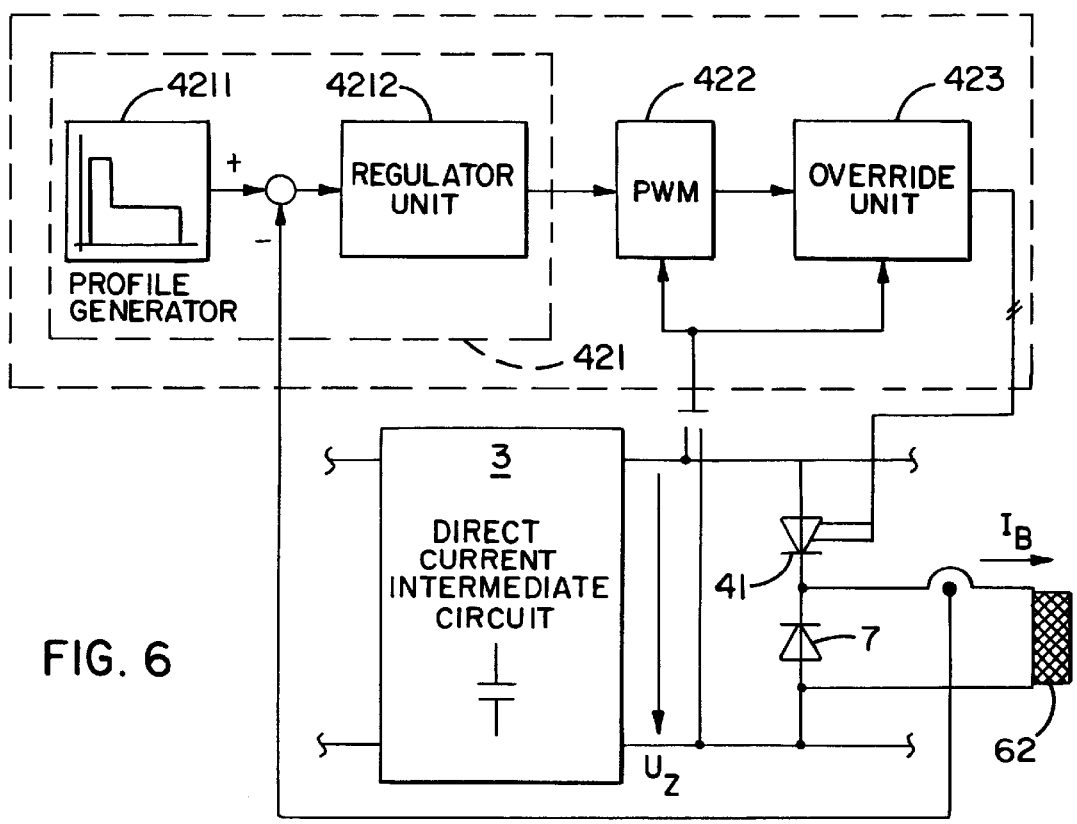
FIG. 6 is a circuit block diagram of a third embodiment of triggering unit.

It is also possible to operate using the embodiment as shown in FIG. 6, in which the current is regulated by reference to a standard current. Here the signal generator 421 comprises a profile generator 4211, the output signal of which is sent to a comparator, the output of which is sent to the input of a regulator unit 4212 in the signal generator 421. The comparator receives from the excitation coil 62 a signal proportional to the current $I_B$, so that the output signal of the comparator corresponds to the difference or deviation between the output value or set point derived from the profile generator 4211 and the current-proportional value or actual value derived from the current sensor.

Figure 7:
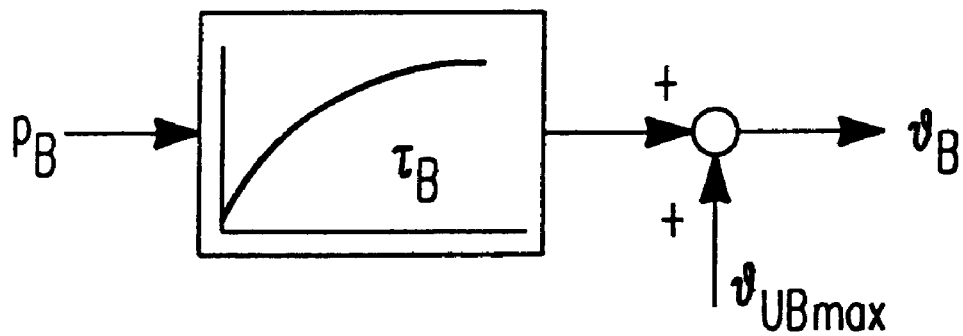
FIGS. 7 and 8 are diagrams showing two methods respectively of deriving the thermal load on an excitation coil.

In all the embodiments described herein, it is advantageous for the thermal state of or the thermal stress on the excitation coil 62 to be monitored. For this purpose, as indicated in FIG. 7, a signal $\vartheta_B$ can be obtained from an actual value $p_B$ of the energy dissipated in the excitation coil 62 on the basis of a thermal time constant $\tau_B$ of the excitation coil 62, with addition of a value $\vartheta_{UB}$max, which corresponds to the maximal ambient temperature of the excitation coil 62. This value $\vartheta_B$ is then, as shown in FIG. 4, further processed in order to protect the excitation coil 62 from overheating.

The actual momentary amount of energy dissipated in the excitation coil 62, the quantity $p_B$, is derived from the current measured through or the voltage measured across the excitation coil 62 and its ohmic resistance, or from the control signal of an electronic on/off one-way valve 41, the (measured) value of the voltage across the output terminals of the DC intermediate circuit 3 and the measured value of the current through the excitation coil 62 or its ohmic resistance. Alternatively it is derived from the measured value of the voltage across the excitation coil 62 and the measured value of the current through the excitation coil 62. The resulting value of $\vartheta_B$, as shown in FIG. 7, is then used at a later stage in the circuitry as shown in FIG. 4.

Figure 8:
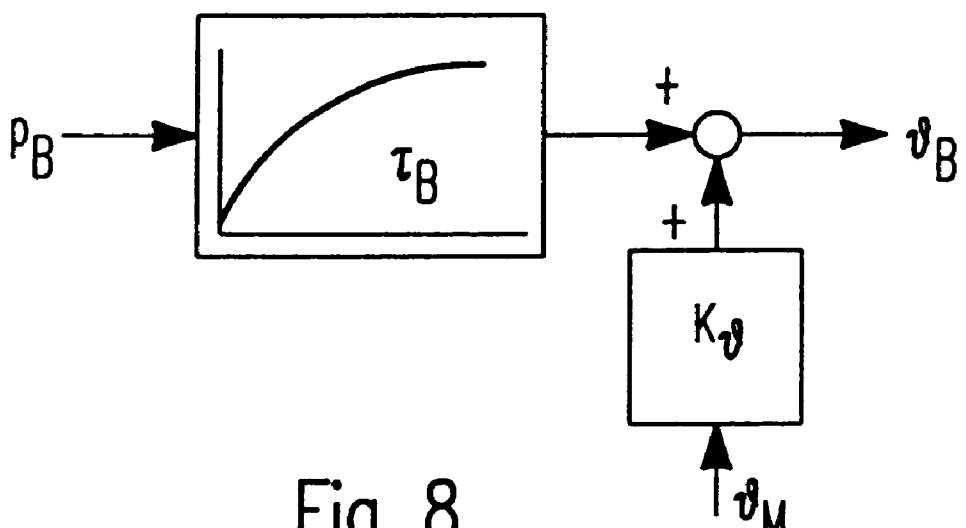

The arrangement shown in FIG. 8 differs from that shown in FIG. 7 in that the derivation is based not on a fixed predetermined maximum ambient temperature $\vartheta_{UB}$max for the excitation coil 62, but rather on a temperature $\vartheta_M$ that corresponds to the temperature measured at the motor 6. This in turn is a representation of the temperature at the electromagnetically actuated mechanical brake or the excitation coil 62, because the brake is attached to the motor 61 by way of a thermally conducting contact area. This motor temperature $\vartheta_M$ allows the excitation coil 62 to be still better utilized, because during ordinary operation the ambient temperature $\vartheta_{UB}$ of the excitation coil 62 is below the value $\vartheta_{UB}$max which is assumed above to be the maximum. The factor $K\vartheta$, by which the motor temperature $\vartheta_M$ is modified, as shown in FIG. 8, is so dimensioned that the quantity $K\vartheta \cdot \vartheta_M$ corresponds approximately to the actual ambient temperature $\vartheta_{UB}$ of the excitation coil 62.

What is claimed is:

1. A method of operating a converter-controlled electric motor with an electromagnetically actuated mechanical brake including an excitation coil, wherein the method comprises the step of:

supplying electrical energy generated by the motor during braking of the electric motor in a generational mode of the motor to the excitation coil of the mechanical brake for at least one of storage temporarily as magnetic energy and conversion to thermal energy and wherein current supplied to the excitation coil of the mechanical brake during at least braking in the generational mode of the motor is sufficient to actuate the mechanical brake in a raised state.

2. A method as claimed in claim 1, wherein during braking in the generational mode of the motor, the excitation coil is supplied with a current sufficient to actuate the brake in a raised state that is greater than at least one of a first current to release the mechanical brake to the raised state and a second current required to maintain the mechanical brake in the raised state.

3. A method as claimed in claim 1, wherein a thermal load on the excitation coil is ascertained and a current supplied to the coil is limited to a predetermined value when the thermal load exceeds a predetermined level.

4. A method as claimed in claim 3, wherein the temperature of the excitation coil is measured in order to ascertain the thermal load.

5. A method as claimed in claim 3, wherein the thermal load on the excitation coil is ascertained from monitoring the value of at least one of the current and the voltage of the excitation coil, in combination with at least one excitation-coil-specific parameter.

6. A method as claimed in claim 3, wherein the excitation-coil-specific parameter comprises its thermal time constant.

7. A method as claimed in claim 3, wherein the thermal load on the excitation coil is ascertained from a measurement of the ambient temperature of the excitation coil.

8. A method as claimed in claim 3, wherein the thermal load on the excitation coil is ascertained from a measurement of the temperature at the electric motor.

9. An electric motor comprising an electromagnetically actuated mechanical brake;

an excitation coil forming part of the mechanical brake;

a converter; and a brake control means connected to the electric motor through the converter and the excitation coil in such a way that electrical energy generated by the motor during braking of the electric motor in a generational mode of operation is supplied to the excitation coil of the mechanical brake for at least one of temporary storage and conversion into heat, and wherein current supplied to the excitation coil of the mechanical brake during at least braking in the generational mode of the motor is sufficient to actuate the mechanical brake in a raised state.

10. A motor as claimed in claim 9, wherein the brake control means is configured such that during braking of the motor in the generational mode, the excitation coil is supplied with a current sufficient to actuate the mechanical brake in a raised state that is greater than at least one of a first current to release the mechanical brake to the raised state and a second current required to maintain the mechanical brake in the raised state.

11. A motor as claimed in claim 9, comprising detection means to ascertain a thermal load on the excitation coil, which detection means are so adapted and connected to the brake control unit that a thermal load on the excitation coil can be determined, in order that when the thermal load exceeds a predetermined level a current supplied to the coil can be limited to a predetermined value.

12. A motor as claimed in claim 11, wherein the detection means comprise temperature sensors that measure the temperature at at least one of the excitation coil and in the vicinity of the excitation coil.

13. A motor as claimed in claim 11, wherein the detection means are adapted to monitor at least one of the values of the current and the voltage of the excitation coil whereby from these values, in combination with at least one excitation-coil-specific parameter, the thermal load can be determined.

14. A motor as claimed in claim 9, comprising a rectifier which together with the motor comprises a unitary device.

15. A motor as claimed in claim 14, comprising a DC intermediate circuit to which the brake control unit and the converter are coupled and to which an output voltage of the rectifier is supplied.

* * * * *